(12) United States Patent
Nihei

(10) Patent No.: US 7,337,456 B1
(45) Date of Patent: Feb. 26, 2008

(54) ADVERTISEMENT METHOD, ADVERTISEMENT APPARATUS, ADVERTISEMENT RECEIVER AND RECORDING MEDIUM

(75) Inventor: Katsumi Nihei, Tokyo (JP)

(73) Assignee: NEC Corporation, Tokyo (JP)

( * ) Notice: Subject to any disclaimer, the term of this patent is extended or adjusted under 35 U.S.C. 154(b) by 646 days.

(21) Appl. No.: 09/699,554

(22) Filed: Oct. 31, 2000

(30) Foreign Application Priority Data

Nov. 2, 1999 (JP) .................................. 11-312487

(51) Int. Cl.
*H04N 7/10* (2006.01)
*H04N 7/025* (2006.01)
*H04N 5/445* (2006.01)
*G06F 3/00* (2006.01)
*G06F 13/00* (2006.01)
*G06Q 30/00* (2006.01)
*G07G 1/14* (2006.01)

(52) U.S. Cl. ............................. 725/35; 725/34; 725/42; 725/46; 705/14; 348/563

(58) Field of Classification Search ................ 725/34, 725/35, 32, 42, 131, 134, 139, 142, 151, 725/46; 705/14, 75; 348/563, 564, 588
See application file for complete search history.

(56) References Cited

U.S. PATENT DOCUMENTS

| | | | | |
|---|---|---|---|---|
| 4,866,770 A | * | 9/1989 | Seth-Smith et al. | ........ 380/212 |
| 6,177,931 B1 | * | 1/2001 | Alexander et al. | ............. 725/52 |
| 6,317,789 B1 | * | 11/2001 | Rakavy et al. | ............... 709/224 |
| 6,332,127 B1 | * | 12/2001 | Bandera et al. | ................ 705/14 |
| 6,336,099 B1 | * | 1/2002 | Barnett et al. | ................. 705/14 |
| 6,408,437 B1 | * | 6/2002 | Hendricks et al. | .......... 725/132 |
| 6,507,949 B1 | * | 1/2003 | Jonason et al. | ................ 725/22 |
| 6,698,020 B1 | * | 2/2004 | Zigmond et al. | ............. 725/34 |

FOREIGN PATENT DOCUMENTS

| | | |
|---|---|---|
| DE | 196 38 515 A | 4/1998 |
| EP | 0 725 504 A | 8/1996 |
| JP | 7-334508 A | 12/1995 |
| JP | 8-123320 A | 5/1996 |
| JP | 9-327002 | 12/1997 |
| JP | 10-79711 | 3/1998 |
| JP | 10-79711 A | 3/1998 |
| JP | 10-111894 | 4/1998 |

(Continued)

*Primary Examiner*—Chris Kelley
*Assistant Examiner*—Joseph G Ustaris
(74) *Attorney, Agent, or Firm*—Sughrue Mion, PLLC

(57) ABSTRACT

An advertisement method considers the circumstances of individual users. This invention comprises a received advertisement database which stores advertisement data; a time obtaining section which obtains the present time; a preference obtaining section which obtains preferences of a user; a position obtaining section which obtains the present position of an advertisement receiver; an advertisement storage processor which sets selection standards for received time, user's receive position, and preferences, selects advertisement data satisfying all the selection standards from the received advertisement data, and stores them in a received advertisement database; an advertisement extracting section which evaluates the time, position, and preferences of the advertisement data stored in the received advertisement database based on the reproduction time, the reproduction position of the user, and user's preferences, and extracts advertisement data in order of the highest evaluations; and an advertisement presenting section which presented the extracted advertisement data to the user.

4 Claims, 9 Drawing Sheets

| | FOREIGN PATENT DOCUMENTS | |
|---|---|---|
| JP | 10-505441 | 5/1998 |
| JP | 10-224724 | 8/1998 |
| JP | 10-240762 A | 9/1998 |
| JP | 10-293793 | 11/1998 |
| JP | 11-500874 A | 1/1999 |
| JP | 11-65434 A | 3/1999 |
| JP | 11-96451 A | 4/1999 |
| JP | 11-265398 A | 9/1999 |
| JP | 11-272685 A | 10/1999 |
| JP | 11-285053 A | 10/1999 |
| WO | WO 96 04633 A | 2/1996 |

* cited by examiner

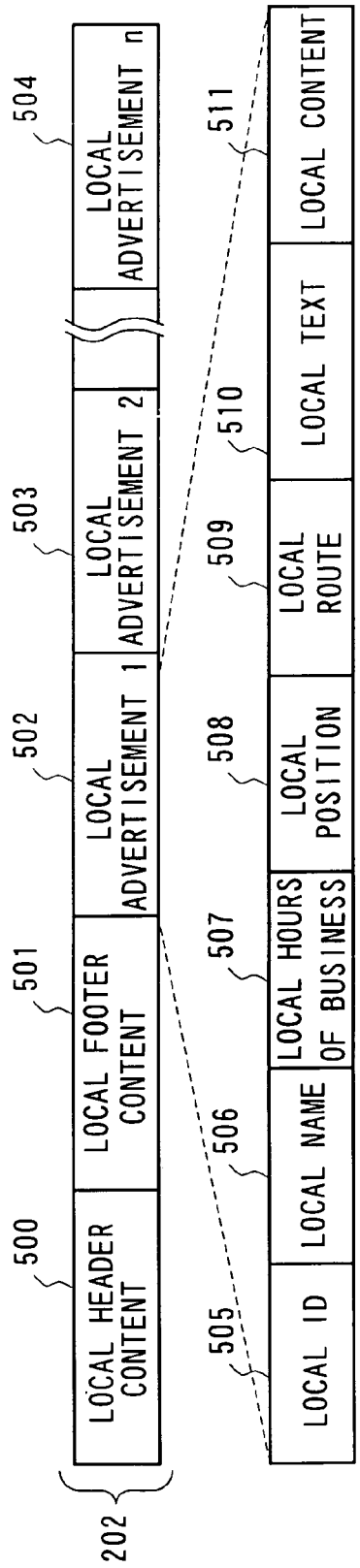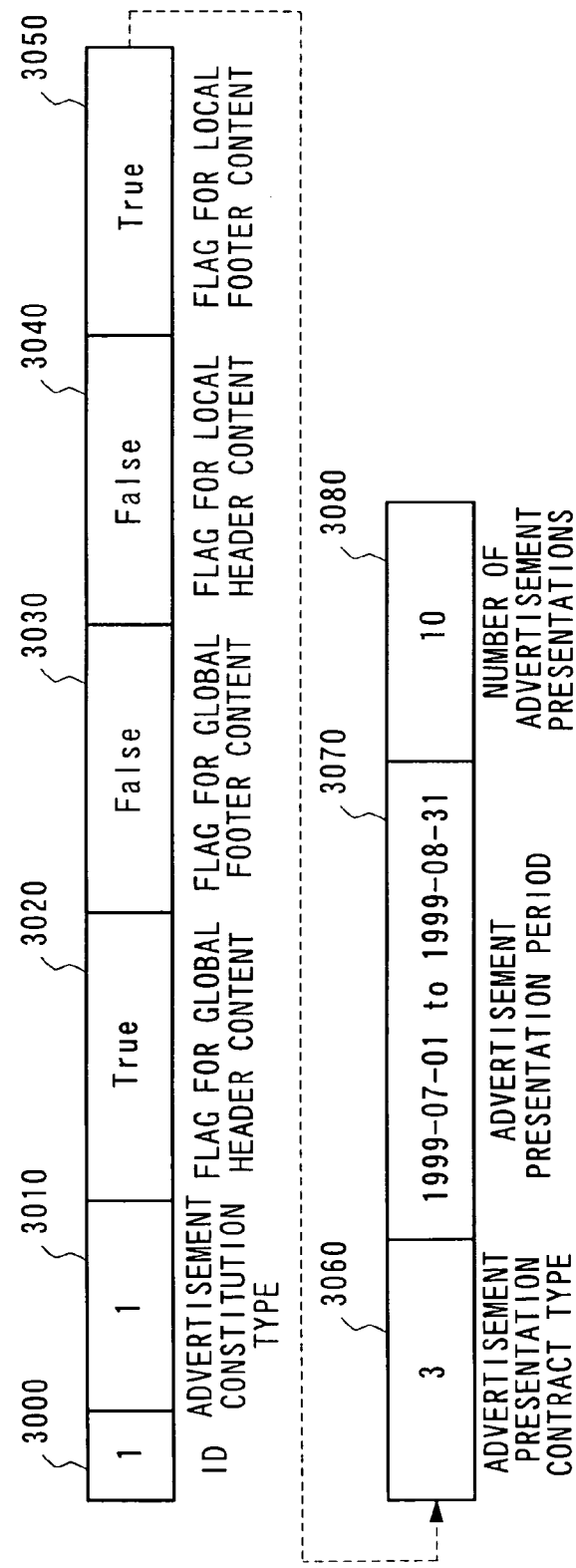

ADVERTISEMENT METHOD, ADVERTISEMENT APPARATUS, ADVERTISEMENT RECEIVER AND RECORDING MEDIUM

BACKGROUND OF THE INVENTION

1. Field of the Invention

The present invention relates to technology for presenting electronic advertisements to users by using broadcasting. In particular, this invention relates to an advertisement method capable of selectively presenting a specific advertisement to a specific user after considering the time, position, and preference of the user, an advertisement apparatus, an advertisement receiver comprising the apparatus, and a recording medium which programs thereof are stored in.

2. Description of the Related Art

In conventional broadcast advertising, a broadcasting station broadcasts the same advertisements to all viewers and listeners, as is the case in over-ground wave television broadcasting and over-ground wave radio broadcasting. The viewers and listeners merely view/listen to the received advertisements in an unaltered state.

Since the range of the radio waves broadcast from the broadcast station is limited, the advertisements consequently have a certain degree of regionality. Nevertheless, the broadcasting is global, making it possible to present advertisements locally in accordance with the position of listeners and viewers.

Published Japanese Patent translation No. WO96/04633 of PCT proposes a method for presenting to a user in a vehicle details of advertisements relating to areas in the vicinity of the vehicle. The advertisement is transmitted by broadcasting sound and data, the sound being presented to the user in an unaltered state and not accumulating in the vehicle, and the data corresponding to the sound broadcast and accumulating in the vehicle. The advertisement is received by an apparatus provided in the vehicle.

However, in the technology disclosed in Japanese Patent Application No. 10-505441, details of the advertisement are presented by receiving the data transmission after listening to the sound broadcast. For this reason, it is difficult to reproduce a complete advertisement to the user at any given time. As a consequence, it is difficult to increase the probability that advertisements which are broadcast while the apparatus is not in use will be received.

In conventional advertisement broadcasting, the valid period of the advertisement depends on the period and duration of the broadcast. However, since it is impossible to link the position of the advertisement with the position of the user, even when advertisements are broadcast only during sales campaigns and the business hours of stores, it is often difficult for users to purchase the advertised products and services during that time. In that case, the users either make the purchase on another occasion or forget about it altogether. Consequently, the company sponsoring the advertisement loses an opportunity for sale.

Conventionally, advertisements are inserted during programs which it is estimated that many target users are watching, supposedly presenting advertisements which suit the preferences of the users. However, this method targets only group preferences and does not consider the preferences of individual users.

SUMMARY OF THE INVENTION

The present invention has been achieved in order to solve the above problems. It is an object of this invention to provide an advertisement method which effectively gives consideration to individual users, an advertisement apparatus, an advertisement receiver, and a recording medium.

In order to achieve the above objects, the advertisement method according to a first aspect of this invention comprises the steps of setting selection standards for a receive time, a receive position and preference of the user, selecting advertisement data which satisfy the standards from the received advertisement data, and storing the selected advertisement data in a received advertisement data base; evaluating the time, positions, and preference of the advertisement data stored in the received advertisement data base based on a reproduction time, a reproduction position and preference of the user, extracting the advertisement data in the order of highest evaluation, and presenting them to the user.

According to the advertisement method of this invention, only the advertisement data which satisfy the standards for time, position, and preference are selected and stored. The stored advertisement data are evaluated generally according to their time, position, and preference, and extracted in the order of highest evaluation. Therefore, an effective advertisement which suits the circumstances of individual users can be realized.

In this invention, the advertisement data comprises only data broadcasts, the moving images and sound being accumulated as data in the vehicle. Therefore, complete advertisements can be reproduced for users at any time.

Consequently, the advertisers (i.e. the companies sponsoring the advertisements) can expect an increased opportunity to sell the advertised products and the like.

According to a second aspect of this invention, when the advertisement data comprises data representing an advertisement period, the selection standard for time deems that the receive time must be within the period.

By selecting only advertisement data which satisfies the selection standard for time, it is possible to increase the probability that users will purchase services and products during that time. As a result, the sponsor companies can expect greater opportunities for sales.

According to a third aspect of the method according to this invention, in the case where the advertisement data comprises data representing the position of the location and the like of the advertisement target, the selection standard for position deems that the receive position is within a fixed distance from the location.

By selecting only advertisement data which satisfies the selection standard for position, it is possible to increase the probability that the users will purchase services and products in that area. As a result, the sponsor companies can expect greater opportunities for sales. In particular, by presenting to the user an advertisement for a store which is located nearby, the probability that the user will purchase services and products at that store can be increased.

According to a fourth aspect of this invention, key words which are of interest to the user and key words which are not of interest to the user are stored. The selection standard for preference deeming that the advertisement data must not contain any key words which are not of interest to the user.

By selecting advertisement data which satisfies the selection standard for the user's preference, advertisements which are of interest to each individual user can be presented instead of advertisements which target groups of users. As a result, the sponsor companies can expect greater opportunities for sales.

According to a fifth aspect of this invention, when the advertisement data comprises data representing the period of the advertisement, the advertisement data is given a high evaluation when its receive time is within the period and a low evaluation when its receive time is outside the period.

Evaluating the time in this way makes it possible to prioritize the presentation of the advertisements in a more timely manner. This increases the probability that the users will purchase services and products during that time. In addition, after reception, it is possible to avoid presenting advertisements which have exceeded their presentation period.

According to a sixth aspect of this invention, when the advertisement data comprises data representing the position of the location and the like of the advertisement target of the advertisement, in evaluating the position of the advertisement data, the shorter the distance between the receive position and the location, the higher the evaluation, and vice versa.

Evaluating the position in this way makes it possible to prioritize the presentation of the advertisements in areas near to the users. This increases the probability that the users will purchase the advertised services and products in those areas. In addition, after reception, it is possible to avoid presenting advertisements for stores which are now far from the user as a result of the user changing his position, for example.

According to a seventh aspect of this invention, key words which are of interest to the user and key words which are not of interest to the user are stored. In evaluating the preference of the advertisement data, the more key words of interest are contained in the advertisement data, the higher the evaluation, and the more key words which are not of interest contained in the advertisement data, the lower the evaluation.

By evaluating the advertisement data by preference in this way, the presentation of advertisements which are of interest to individual users can be prioritized while avoiding the presentation of advertisements which are of little interest.

According to an eighth aspect of this invention, in transmitting the advertisement data, an advertisement transmission row comprising advertisement main units of the advertisement data repeatedly written in order is created and transmitted.

Consequently, the probability that the advertisement data will be received can be increased even when there are periods during which the advertisements cannot be received, such as when the power of the advertisement receiver is switched off, According to a ninth aspect of this invention, an advertisement apparatus comprises an advertisement transmitter which transmits advertisement data by using broadcasts, and an advertisement receiver which receives the advertisement data and presents it to users. The advertisement transmitter comprises a transmission advertisement data base for storing the advertisement data; an advertisement obtaining section which extracts the advertisement data from the transmission advertisement data base; and an advertisement transmitting section which transmits the advertisement data extracted by the advertisement obtaining section as an advertisement transmission row to the advertisement receiver. The advertisement receiver comprises an advertisement receiving section which receives the advertisement transmission row; a received advertisement data base for storing the advertisement data; a time obtaining section which obtains the present time; a preference obtaining section which obtains a preference of the user; a position obtaining section which obtains the present position of the advertisement receiver; an advertisement storage processing section which sets selection standards for a receive time, a receive position and the preference of the user, selects advertisement data which satisfy the standards from the received advertisement data, and stores the selected advertisement data in the received advertisement data base; and an advertisement extracting section which evaluates the time, position, and preference of the advertisement data stored in the received advertisement data base based on a reproduction time, a reproduction position and preference of the user, extracts the advertisement data in the order of highest evaluation, and presents the advertisement data to the user.

According to the advertisement apparatus of this invention, only advertisement data which satisfy standards relating to time, position, and preference are selected and stored. The advertisement data which have been stored are evaluated generally according to time, position, and preference, and are extracted in the order of highest evaluation. Therefore, it is possible to achieve effective advertisements which suit the circumstances of each individual user.

Since the advertisement data are selectively stored in the received advertisement data base, an overflow of data in the finite-capacity received advertisement data base can be avoided even when a large amount of advertisement data has been transmitted.

Further, according to this invention, the advertisement data comprises only data broadcasts, the moving images and sound being accumulated as data in the vehicle. Therefore, complete advertisements can be reproduced for users at any time.

Consequently, by using the advertisement apparatus of this invention, the advertisers (i.e. the companies sponsoring the advertisements) can expect an increased opportunity to sell the advertised products and the like.

According to a tenth aspect of this invention, the advertisement receiver further comprises an advertisement deletion processing section which, when the advertisement data comprises data representing a period of an advertisement contained in the advertisement data, deletes advertisement data having a present time outside the period from the received advertisement data base. In the case where the advertisement data comprises data representing a number of presentations of an advertisement contained in the advertisement data, the advertisement deletion processing section deletes advertisement data comprising an advertisement which has been presented a number of times equal to the number of presentations from the received advertisement data base.

By providing the advertisement deletion processing section, advertisement data which is no longer needed can be easily deleted from the received advertisement data base.

An eleventh aspect of this invention provides an advertisement receiver for receiving advertisement data transmitted by using broadcasting and presenting the advertisement data to a user. The advertisement receiver comprises an advertisement receiving section which receives the advertisement transmission row; a received advertisement data base for storing the advertisement data; a time obtaining section which obtains the present time; a preference obtaining section which obtains a preference of the user; a position obtaining section which obtains the present position of the advertisement receiver; an advertisement storage processing section which sets selection standards for a receive time, a receive position and the preference of the user, selects advertisement data which satisfy the standards from the received advertisement data, and stores the selected advertisement data in the received advertisement data base; an advertisement extracting section which evaluates the time, position, and preference of the advertisement data stored in the received advertisement data base based on a reproduction time, a reproduction position and preference of the user, extracts the advertisement data in the order of highest evaluation, and presents the advertisement data to the user;

and an advertisement presenting section which presents the advertisement data extracted by the advertisement extracting section to the user.

According to the advertisement receiver of this invention, only advertisement data which satisfy standards relating to time, position, and preference are selected and stored. The advertisement data which have been stored are evaluated generally according to time, position, and preference, and are extracted in the order of highest evaluation. Therefore, it is possible to achieve effective advertisements which suit the circumstances of each individual user.

A twelfth aspect of this invention provides a recording medium which is used in presenting advertisement data transmitted by using broadcasting to a user. The recording-medium stores programs for allowing a computer to execute the processes of setting selection standards for a receive time, a receive position and preferences of the user, selecting advertisement data which satisfy the standards from the received advertisement data, and storing the selected advertisement data in a received advertisement data base; evaluating the time, positions, and preference of the advertisement data stored in the received advertisement data base based on a reproduction time, a reproduction position and preference of the user, extracting the advertisement data in the order of highest evaluation; and presenting the extracted advertisement data to the user.

The computer reads and executes the programs which are stored in the recording medium of this invention. Therefore, effective advertisements which suit the circumstances of each individual user can be realized.

BRIEF DESCRIPTION OF THE DRAWINGS

FIG. 6 is a diagram showing the constitution of an advertisement transmission row;

FIG. 7 is a diagram showing an embodiment of a header of advertisement data;

DETAILED DESCRIPTION OF THE PREFERRED EMBODIMENTS

Preferred embodiments of this invention will be explained with reference to the diagrams.

In the following embodiments, the processes from receiving an advertisement to presenting it are executed by a computer in compliance with a program. The program is, for example, provided by a recording medium. For example, a magnetic disk, a semiconductor memory, or another type of computer-readable medium can be used as the recording medium. The program which is recorded in the recording medium can be read by the computer via a communications line.

Example Constitution of Advertisement Apparatus

An advertisement apparatus comprising the advertisement receiver of this invention will be explained with reference to FIG. 1.

Figure 1:
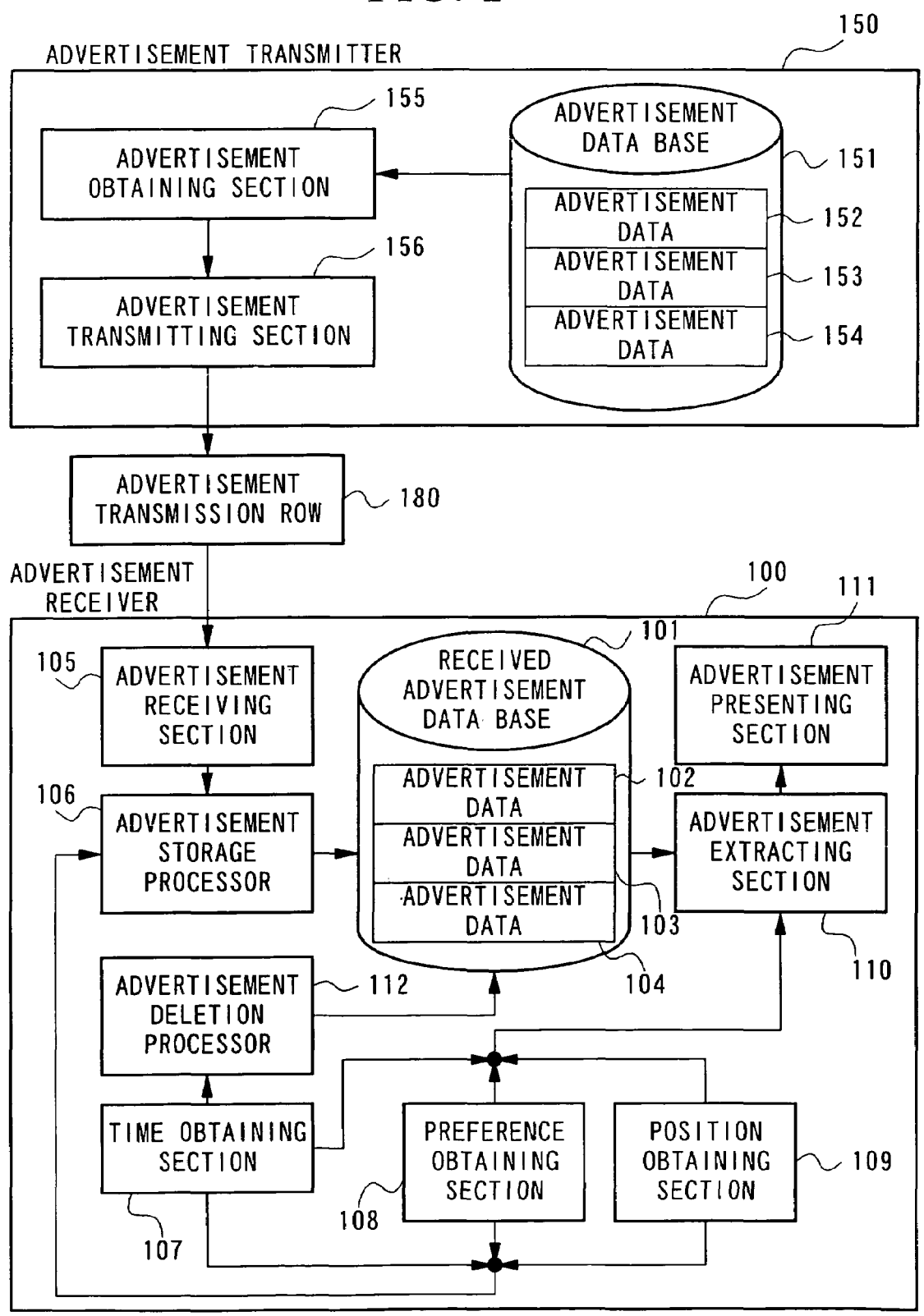
FIG. 1 is a diagram showing the constitution of this invention.

As shown in FIG. 1, the advertisement apparatus of this invention comprises an advertisement transmitter 150 which transmits advertisement data by using a broadcast, and an advertisement receiver 100 which receives the advertisement data and presents it to users.

Advertisement Transmitter

Firstly, the constitution of the advertisement transmitter 150 will be explained.

The advertisement transmitter 150 is an apparatus which electronically transmits advertisements. A transmitter in a broadcasting station is an example of such a transmitter, but the constitution is not restricted this. The advertisement transmitter 150 comprises a transmission advertisement data base 151, an advertisement obtaining section 155, and an advertisement transmitting section 156.

The transmission advertisement data base 151 may, for example, comprise a related data base or a filing system, but its constitution is not restricted to these. The transmission advertisement data base 151 stores advertisement data of electronic advertisements which are to be transmitted. For the sake of convenience, FIG. 1 shows three advertisement data 152, 153 and 154, but there is no restriction on the actual number of advertisement data which are stored.

The internal constitution of the advertisement data will be explained later.

The advertisement obtaining section 155 obtains the advertisement data from the transmission advertisement data base 151, and the advertisement transmitting section 156 transmits the obtained advertisement data to the advertisement receiver 100 as an advertisement transmission row 180.

The advertisement transmission row 180 may be transmitted by satellite digital television broadcast, satellite digital broadcast, over-ground wave digital television broadcast, ground wave digital radio broadcast, CATV (cable television) and the like, there being no restrictions on the method of transmission.

The advertisement data comprises only the data broadcast. Data representing moving images and sound are accumulated in the advertisement receiver 100 which is mounted in a vehicle or the like. Therefore, a complete advertisement can be reproduced for the user at any time.

Figure 2:
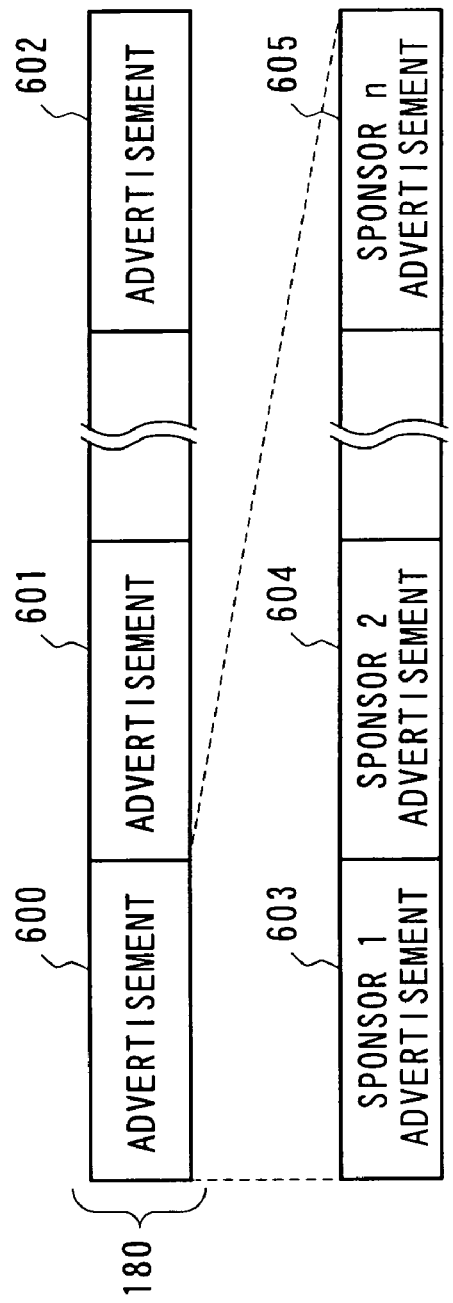
FIG. 2 is a diagram showing the constitution of advertisement data.

As shown in FIG. 2, in this embodiment, the advertisement data are sequentially written by advertisement main units (sponsor advertisement units) 603, 604 and 605, and are repeated to create the advertisement transmission row 180. As shown in the example of FIG. 2, each of the advertisements 600, 601, and 602 comprises a sponsor 1 advertisement 603, a sponsor 2 advertisement 604, and a sponsor n advertisement 605.

By repeatedly transmitting advertisements having the same content in this way, the probability that the advertisement data will be received can be increased even when there are periods where the advertisements cannot be received because the advertisement receiver 100 is switched off and the like.

Advertisement Data

Subsequently, prior to explaining the advertisement receiver 100, the constitution of the advertisement data which comprises the advertisement transmission row will be explained based on FIG. 3.

Figure 3:
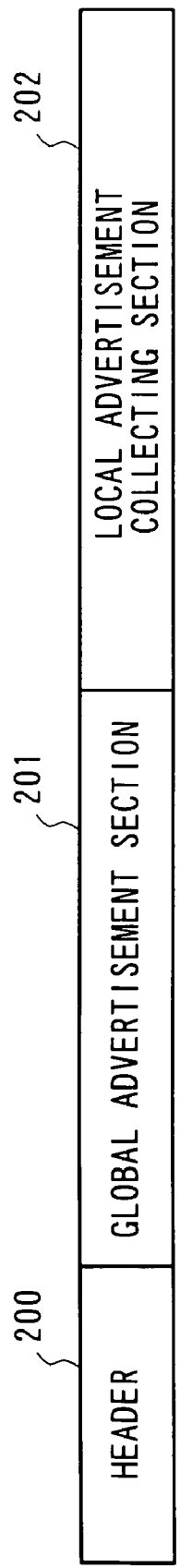
FIG. 3 is a diagram showing the constitution of a header of advertisement data.

As shown in FIG. 3, the advertisement data in this embodiment comprises a header 200, a global advertisement section 201, and a local advertisement collecting section 202. The header 200 describes the basic origin of the advertisement. The global advertisement section 201 describes one of the contents of the advertisement which is presented to users irrespective of the region where they are located. The local advertisement collecting section 202 describes a predetermined number of contents of the advertisement which are presented to users in each region and depend on the region.

Subsequently, the constitution of the header 200 will be explained with reference to FIG. 4.

Figure 4:
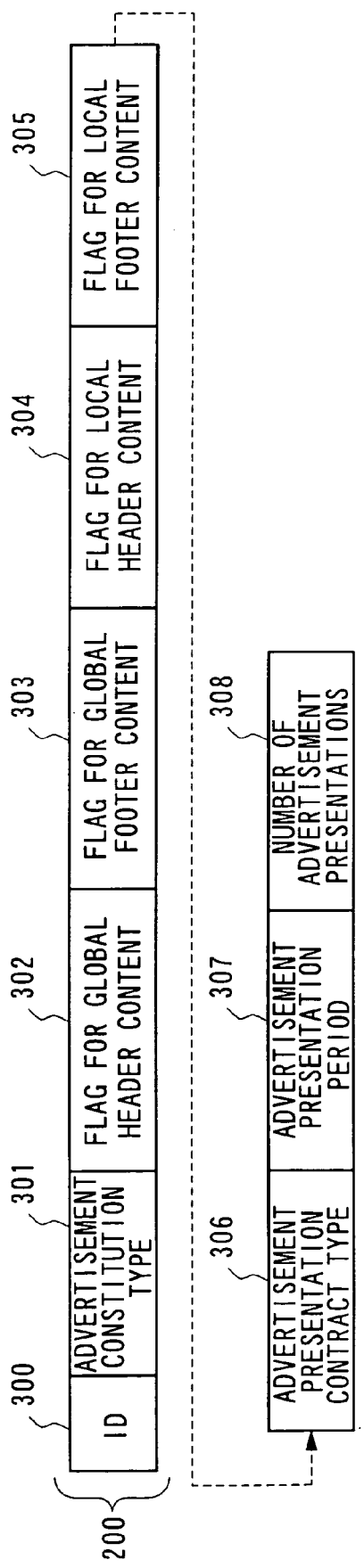
FIG. 4 is a diagram showing the constitution of a global advertisement section of advertisement data.

As shown in FIG. 4, the header 200 of this embodiment comprises an ID 300, an advertisement constitution type 301, a flag for global header content 302, a flag for global footer content 303, a flag for local header content 304, a flag for local footer content 305, an advertisement presentation contract type 306, an advertisement presentation period 307, and a number of advertisement presentations 308.

The ID 300 describes a unique value for identifying the advertisement data, e.g. a numerical value or a letter row. The advertisement constitution type 301 specifies the organization type of the advertisement presented to the user. For example, when the advertisement data comprises a combination of global and local advertisements, "1" is written in the advertisement organization type 301. On the other hand, when the advertisement data comprises only a global advertisement, "2" is written.

The flag for global header content 302 specifies whether or not to use a global header content 407 described later (see FIG. 5) in the advertisement presented to the users. For example, the flag 302 indicates "True" when the global header content 407 is to be used, and "False" when it is not to be used.

The flag for global footer content 303 specifies whether or not to use a global footer content 408 described later (see FIG. 5) in the advertisement presented to the users. For example, the flag 303 indicates "True" when the global footer content 408 is to be used, and "False" when it is not to be used.

The flag for local header content 304 specifies whether or not to use a local header content 500 described later (see FIG. 6) in the advertisement presented to the users. For example, the flag 304 indicates "True" when the local header content 500 is to be used, and "False" when it is not to be used.

The flag for local footer content 305 specifies whether or not to use a local footer content 501 described later (see FIG. 6) in the advertisement presented to the users. For example, the flag 305 indicates "True" when the local footer content 501 is to be used, and "False" when it is not to be used.

The advertisement presentation contract type 306 specifies the type of advertisement presentation contract. For example, "1" is written when specifying the period of the presentation of the advertisement according to the contract, "2" is written when specifying the number of presentations of the advertisement, and "3" is written when specifying the period and the number of presentations.

The advertisement presentation period 307 specifies the presentation period of the advertisement when the value of the advertisement presentation contract type 306 is "1" or "2". The number of advertisement presentations 308 specifies the number of presentations of the advertisement when the value of the advertisement presentation contract type 306 is "2" or "3".

Subsequently, the constitution of the global advertisement section 201 will be explained with reference to FIG. 5.

Figure 5:
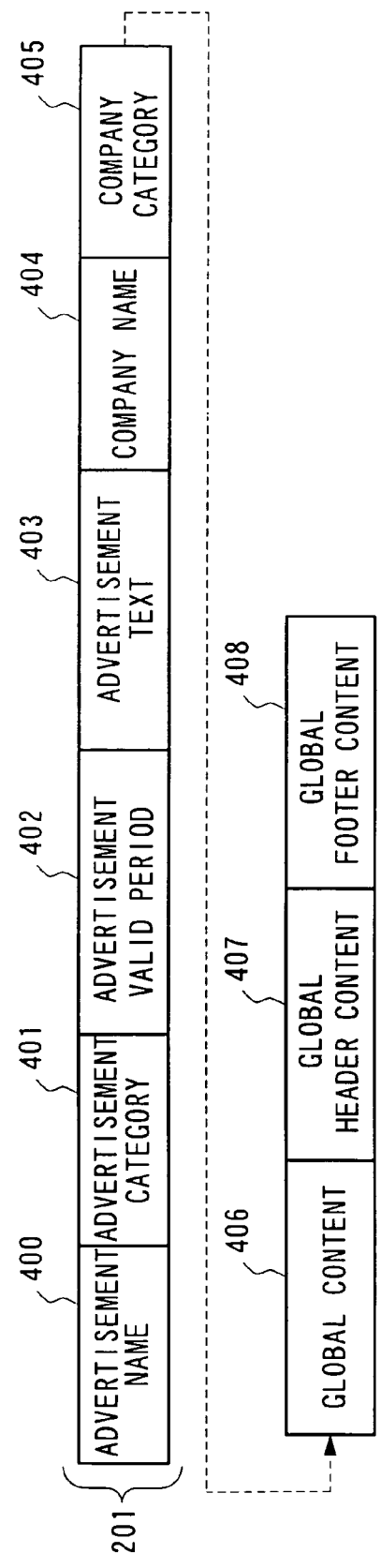
FIG. 5 is a diagram showing the constitution of a local advertisement collecting section of advertisement data.

As shown in FIG. 5, the global advertisement section 201 comprises an advertisement name 400, an advertisement category 401, an advertisement valid period 402, an advertisement text 403, a company name 404, a company category 405, a global content 406, a global header content 407, and a global footer content 408.

The advertisement name 400 describes the name of the advertisement. The advertisement category 401 describes the category of the advertisement by using, for example, a collection of key words. The advertisement valid period 402 describes the valid period of the advertisement. The advertisement text 403 textually describes the content of the advertisement. The company name 404 describes the name of the company which is sponsoring the advertisement. The company category 405 describes the category of the company sponsoring the advertisement by using, for example, a collection of key words.

The global content 406 describes the content of the advertisement which is presented to users irrespective of the region where they are located. For example, the content comprises one or a combination of a moving image, a still image, and sound.

The global header content 407 describes the content of the advertisement which is presented to users immediately prior to the global content. The header content for example comprises one or a combination of a moving image, a still image, and sound. For example, the header content describes music or a logo symbolizing the image of the sponsor company.

The global footer content 408 describes the content of the advertisement presented to the users immediately after the global content. The global footer content for example comprises one or a combination of a moving image, a still image, and sound. For example, the global footer content describes music or a logo symbolizing the image of the sponsor company.

Subsequently, the constitution of the local advertisement collecting section 202 will be explained with reference to FIG. 6.

As shown in FIG. 6, the local advertisement collecting section 202 comprises a local header content 500, a local footer content 501, and one or multiple local advertisements 502, 503, and 504.

Each local advertisement contains the content of an advertisement to be presented to user in each region and depending on the region. For example, in the case of an advertisement for a hamburger chain, the local advertisements comprises advertisements for each store of the chain.

Each local advertisement comprises a local ID 505, a local name 506, a local hours of business 507, a local position 508, a route 509, a local text 510, and a local content 511.

The local ID 505 describes a unique value for instantly identifying the local advertisement, e.g. a numerical value or a letter row. The local name 506 describes the name of the local outlet advertised in the local advertisement. For example, in the case of an advertisement for a hamburger chain, the local outlet is the chain store. Therefore, the name of the chain store is written as the local name.

The local hours of business 507 describes the hours of business of the local outlet of the local advertisement. For example, in the case of an advertisement for a hamburger chain, the local hours of business 507 describes the hours of business of the chain store.

The local position 508 describes the position of the local outlet of the local advertisement. For example, in the case of an advertisement for a hamburger chain, the position of the chain store is written as the local position by listing its address, latitude, and longitude.

The route 509 describes a predetermined number of ways to reach the local outlet from nearby landmarks.

Here, "landmarks" denotes well-known buildings and the like in the local area e.g. stations, highway interchanges, and the like. The route for example describes the latitude and longitude of intersections where directional choices must be made on roads along the routes from the landmarks to the local outlet. The routes from the landmarks to the local outlet may be described by using still images, text, and sound data.

The local text 510 textually describes the content of the local advertisement. For example, in the case of a hamburger chain, the local text introduces the chain store.

The local content 511 describes the content of the local advertisement presented to the users, and for example comprises one or a combination of a moving image, a still image, and sound.

The local header content 500 describes the content of the advertisement presented to the users immediately prior to the local content 511, and for example comprises one or a combination of a moving image, a still image, and sound.

The local footer content 501 describes the content of the advertisement presented to the users immediately after the local content 511, and for example comprises one or a combination of a moving image, a still image, and sound.

Advertisement Receiver

Next, the constitution of the advertisement receiver 100 will be explained.

The advertisement receiver 100 is an apparatus which receives an electronic advertisement transmitted from the advertisement transmitter 150 and presents it to the user. For example, the advertisement receiver 100 may comprise a portable computer or a car navigation system, but is not restricted to these.

The advertisement receiver 100 comprises an advertisement receiving section 105, a received advertisement data base 101, a time obtaining section 107, a preference obtaining section 108, a position obtaining section 109, an advertisement storage processor 106, an advertisement extracting section 110, an advertisement presenting section 111, and an advertisement deletion processor 112.

The time obtaining section 107 obtains the present time and comprises, for example, a clock, though there is no restriction on this.

The preference obtaining section 108 obtains the preferences of the user. For example, the preferences may be set by asking the user to input key words which interest him and those which do not. The method for obtaining the preferences is not restricted to this.

The position obtaining section 109 obtains the present position of the advertisement receiver 100, that is, the present position of the user. For example, the position obtaining section 109 may comprise a receiver for a global positioning system (GPS). However, the method for obtaining the position is not restricted to this.

The advertisement receiving section 105 receives the advertisement transmission row 180 which has been transmitted from the advertisement transmitter 150. The received advertisement transmission row 180 is transferred to the advertisement storage processor 106.

The advertisement storage processor 106 sets selection standards for the receive time and receive positions and preferences of the user, and selects advertisement data which satisfies the selection standards.

When the advertisement data comprises data representing the period of the advertisement, the selection standard need only specify that, for example, the receive time is within the above period. When the advertisement data comprises data representing the position of the location and the like of the advertisement target, the selection standard need only specify that, for example, the receive position is within a fixed distance from the position of the location. By registering the key words which interest the user and those which do not, the selection standard for the preference can specify that the standard should not contain any key words which do not interest the user.

The selected advertisement data is stored in the received advertisement data base 101. As in the case of the transmission advertisement data base 151, the received advertisement data base 101 may, for example, comprise a related data base and a filing system, but its constitution is not restricted to this.

For sake of convenience, FIG. 1 shows three stored advertisement data 102, 103 and 104, but there is no restriction on the actual number of advertisement data which are stored.

The advertisement data is selectively stored in the received advertisement data base 101. Therefore, even when a large amount of advertisement data has been transmitted, it is possible to prevent the received advertisement data base which has a limited capacity from becoming overloaded.

Subsequently, the advertisement extracting section 110 evaluates the time, position, and preferences of the advertisement data stored in the received advertisement data base 101 based on the reproduction time and reproduction position and preference of the user. The advertisement data are extracted in order of highest evaluation.

In evaluating, for example, when the advertisement data comprises data representing the period of the advertisement, the advertisement data is evaluated by time, the evaluation "et" being high when the received time is within the advertisement period and low when the received time is outside the advertisement period.

When the advertisement data comprises data representing the position of the location and the like of the advertisement target, the advertisement data is evaluated by its position, the evaluation "ep" being high when the distance between the received position and the location is short and low when this distance is long.

Key words which interest the user and key words which do not interest the user are stored, and the advertisement data is evaluated according to preference, the evaluation "eo" being high when the advertisement data contains many key words of interest and low when the advertisement data contains many key words of no interest.

A general evaluation of all the advertisement data is made based on the evaluations for position, time and preference "et", "ep", and "eo" to determine a general evaluation value "e". In the general evaluation, "wt", "wp", and "wo" are appended to the evaluations of the position, time, and preference respectively. The general evaluation value "e" is for example calculated by the following equation (1):

$$e=(wp.ep)+(wt.et)+(wo.eo) \tag{1}$$

The advertisement extracting section 110 extracts a predetermined number of highly evaluated advertisement data from the evaluated advertisement data in the order of highest evaluation.

The advertisement presenting section 111 presents the advertisement data, which have been extracted by the advertisement extracting section 110, to the user.

The advertisement receiver 100 of this embodiment further comprises an advertisement deletion processor 112. The advertisement deletion processor 112 compares the valid periods of the advertisement data 102, 103, and 104 stored in the received advertisement data base 101 with the time obtained by the time obtaining section 107, and deletes the advertisement data which have exceeded their valid periods.

For example, when a bargain sale lasts from 1 February to 10 February, advertisements for the bargain sale usually begin before the start of the sale, e.g. from 15 January to 10 February. In this case, the period from 1 February to 10 February corresponds to the advertisement valid period 402 of the local advertisement collecting section 202. The advertisement period from 15 January to 10 February corresponds to the advertisement presentation period 307 of the header

200. The advertisement deletion processor 112 may use either the advertisement valid period 402 or the advertisement presentation period 307 as the valid period.

Subsequently, an advertisement for a hamburger chain will be explained by way of specific example of advertisement data. Thereafter, the operation of the advertisement receiver 100 after receiving the advertisement data of the example will be explained, particularly the processing of the advertisement storage processor 106 and the advertisement extracting section 110.

Specific Example of Header

Firstly, a specific example of the header 200 shown in FIGS. 3 and 4 will be explained with reference to FIG. 7 as a specific example of advertisement data.

In the example shown in FIG. 7, a unique value of "1" for instantly identifying the advertisement data is written in the ID box 3000.

A value of "1" is written in the advertisement organization type box 3010, and indicates an advertisement which combines a global advertisement and a local advertisement, as described above.

This example uses the global header content 407. Therefore, "True" is written in the flag for global header content box 3020 as described above.

This example does not use the global footer content 408. Therefore, "False" is written in the flag for global footer content box 3030 as described above.

This example does not use the local header content 500. Therefore, "False" is written in the flag for local header content box 3040, as described above.

This example uses the local footer content 501. Therefore, "True" is written in the flag for local footer content box 3050, as described above.

This example specifies both the presentation period and the number of presentations as the contract type. Therefore, "3" is written in the advertisement presentation contract type box 3060.

In this example, the advertisement is presented from 1 Jul. 1999 until 31 Aug. 1999. Therefore, "1999-07-01 to 1999-8-31" is written in the advertisement presentation period box 3070.

In this example, the advertisement is presented ten times. Therefore, "10" is written in the number of advertisement presentations box 3080.

Specific Example of Global Advertisement Section

Subsequently, a specific example of the global advertisement section 201 shown in FIGS. 3 and 5 will be explained with reference to FIG. 8 as a specific example of advertisement data.

Figure 8:
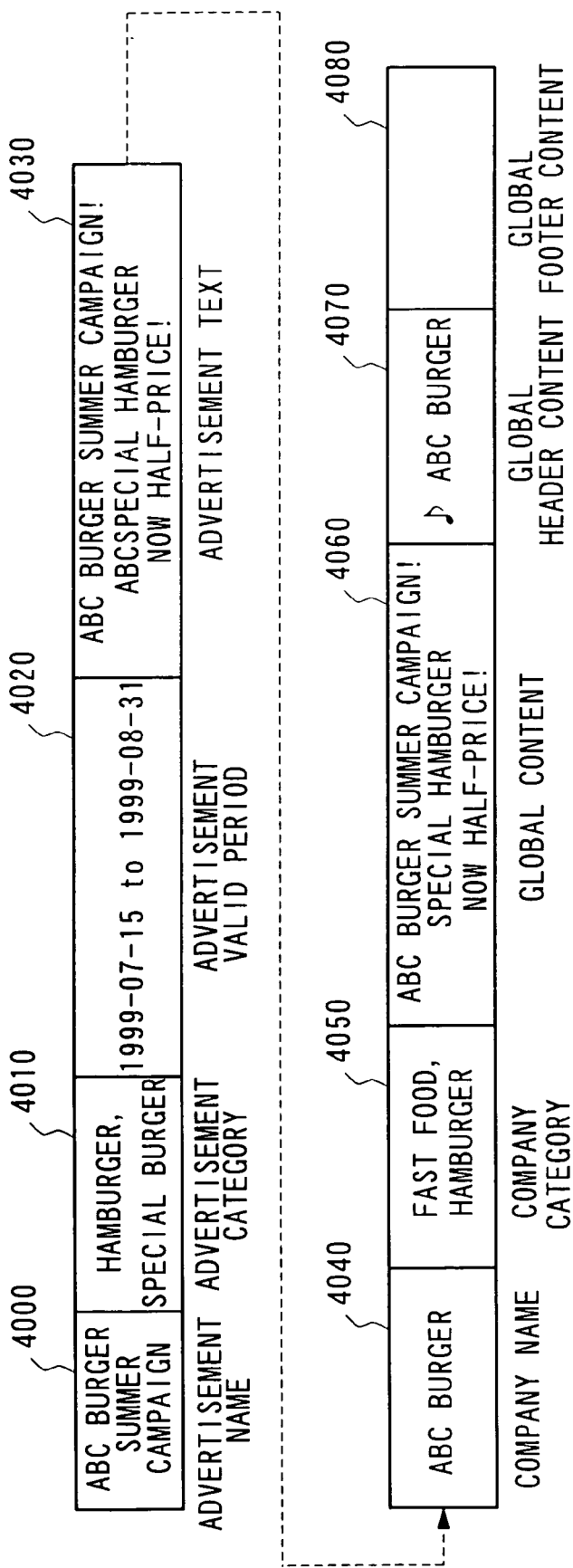
FIG. 8 is a diagram showing an embodiment of a global advertisement section of advertisement data.

In the example shown in FIG. 8, "ABC Burger Summer Campaign" is written as the name of the advertisement in the advertisement name box 4000 of the global advertisement section 201.

In this example, the advertisement relates to hamburgers and special burgers. Therefore, "hamburger" and "special burger" are written in the advertisement category box 4010.

In this example, the valid period of the "ABC Burger Summer Campaign" is 15 Jan. 1999 to 31 Aug. 1999. Therefore, "1999-07-15 to 1999-08-31" is written in the advertisement valid period box 4020.

In this example, the content of the advertisement is entered as the text "ABC Burger Summer Campaign! Special Hamburger Now Half-price!" in the advertisement text box 4030.

In this example, "ABC Burger" is written in the company name box 4040 as the name of the company which is sponsoring the advertisement.

In this example, "ABC Burger" is a fast-food hamburger store. Therefore, "fast-food" and "hamburger" are written as the company category of the advertisement in the company category box 4050.

As the content of the advertisement which is presented to users irrespective of region, in this example, "ABC Burger Summer Campaign! Special Hamburger Now Half-price!" is entered as sound data in the global content box 4060.

In FIG. 8, the sound data is represented by appending musical notes where appropriate.

As the advertisement content in this example, the name of the company "ABC Burger" accompanied by BGM (background music) is entered as sound data in the global header content box 4070.

The global footer content box 4080 is left empty, since this example does not use a global footer content.

Specific Example of Local Collecting Section

Subsequently, a specific example of a local collecting section will be explained with reference to FIG. 9, by using the local advertisement collecting section 202 shown in FIG. 3 and one local advertisement from the local advertisements 5020, 5030, and 5040 comprising the above which are shown in FIG. 6.

Figure 9:
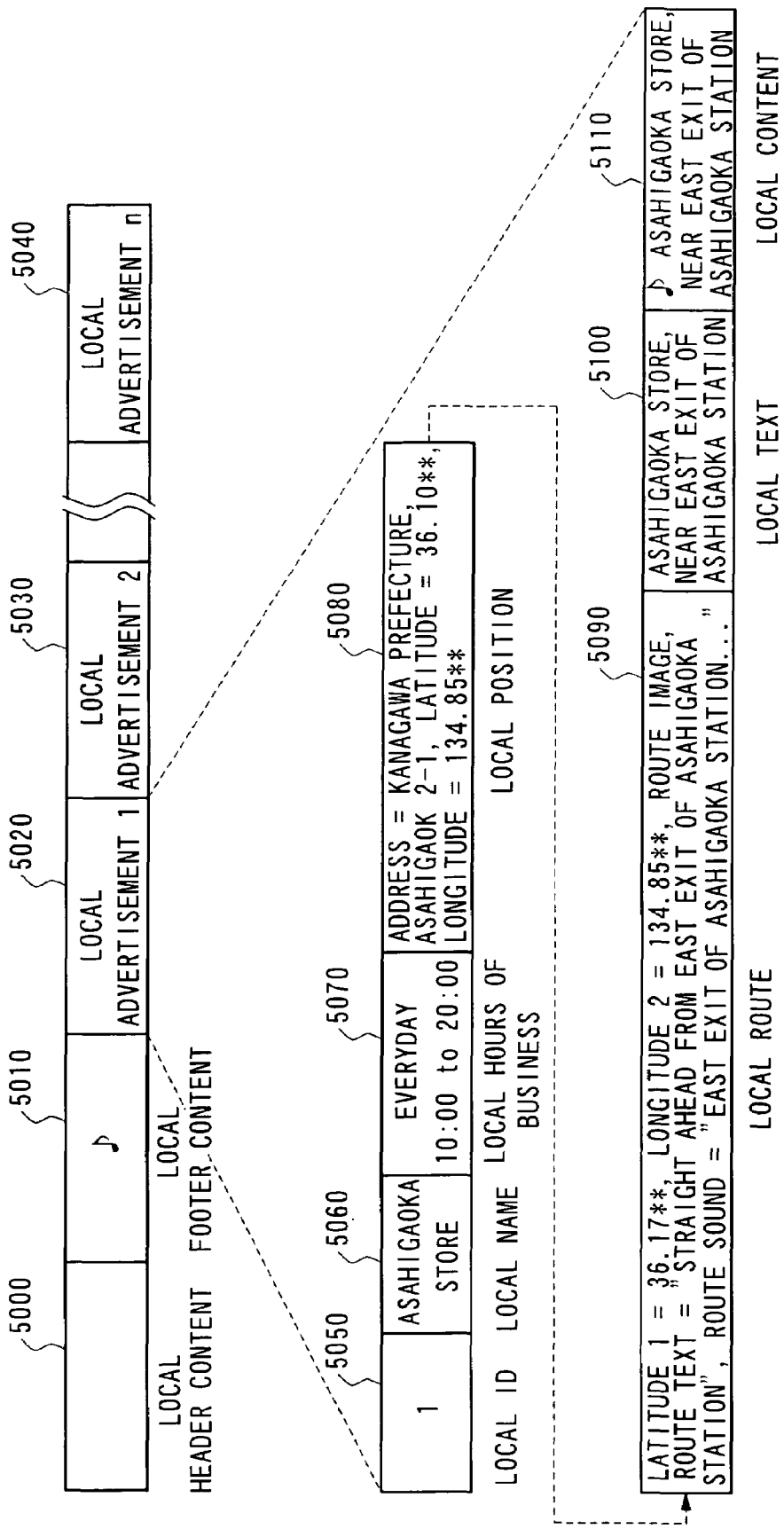
FIG. 9 is a diagram showing an embodiment of a local advertisement collecting section of advertisement data.

In the example shown in FIG. 9, the local header content box 5000 is empty, since a local header content is not used in this specific example.

Sound data representing a sound effect of "Wow!" is written in the local footer content box 5010 as the content to be presented immediately after the local content.

In FIG. 9, the sound data is represented by appending musical notes where appropriate.

In the example shown in FIG. 9, a unique value of "1" for identifying the local advertisement is written in the local ID box 5050.

This example is an advertisement for a hamburger chain. Therefore, the name of the chain store "Asahigaoka Store" is written in the local name box 5060.

In this example, the hours of business of the chain store are from 10 a.m. to eight p.m. everyday. Therefore, "everyday 10:00 to 20:00" is written in the local hours of business box 5070.

In this example, the address of the chain store is "Asahigaoka 2-1, Kanagawa Prefecture" and the latitude is "North 36 degrees 17 minutes  seconds" and the longitude is "East 134 degrees 85 minutes  seconds" (where  is a given numeral). Therefore, the local position box 5080 is written as shown in FIG. 9**.

In this example, the hamburger chain store is located directly ahead of the east exit of Asahigaoka Station. Therefore, the local route box 5090 contains the latitude and longitude of intersections where directional choices must be made along the route from nearby landmarks to the local outlet. In addition, the route from the landmarks to the local outlet is expressed by using still images, text, and sound data.

As shown in FIG. 9, a route image (described later in FIG. 12) is entered in the local route box 5090 in addition to the route latitude 1 of "36.10.", the route longitude 2 of "134.85. ", the route text of "From the east exit of Asahigaoka station, go straight ahead . . . ", and the route sound of "From the east exit of Asahigaoka station . . . ".

In this example, a chain store introduction of "Asahigaoka store, near the east exit of Asahigaoka Station" is written in the local text box 5100.

In this example, a local advertisement content of "Asahigaoka store, near the east exit of Asahigaoka Station" and sound data is written in the local content box 5110.

Example of Processing Operation of Advertisement Storage Processor

Subsequently, one example of a processing operation which is performed by the advertisement storage processor 106 will be explained with reference to the flowchart of FIG. 10.

Figure 10:
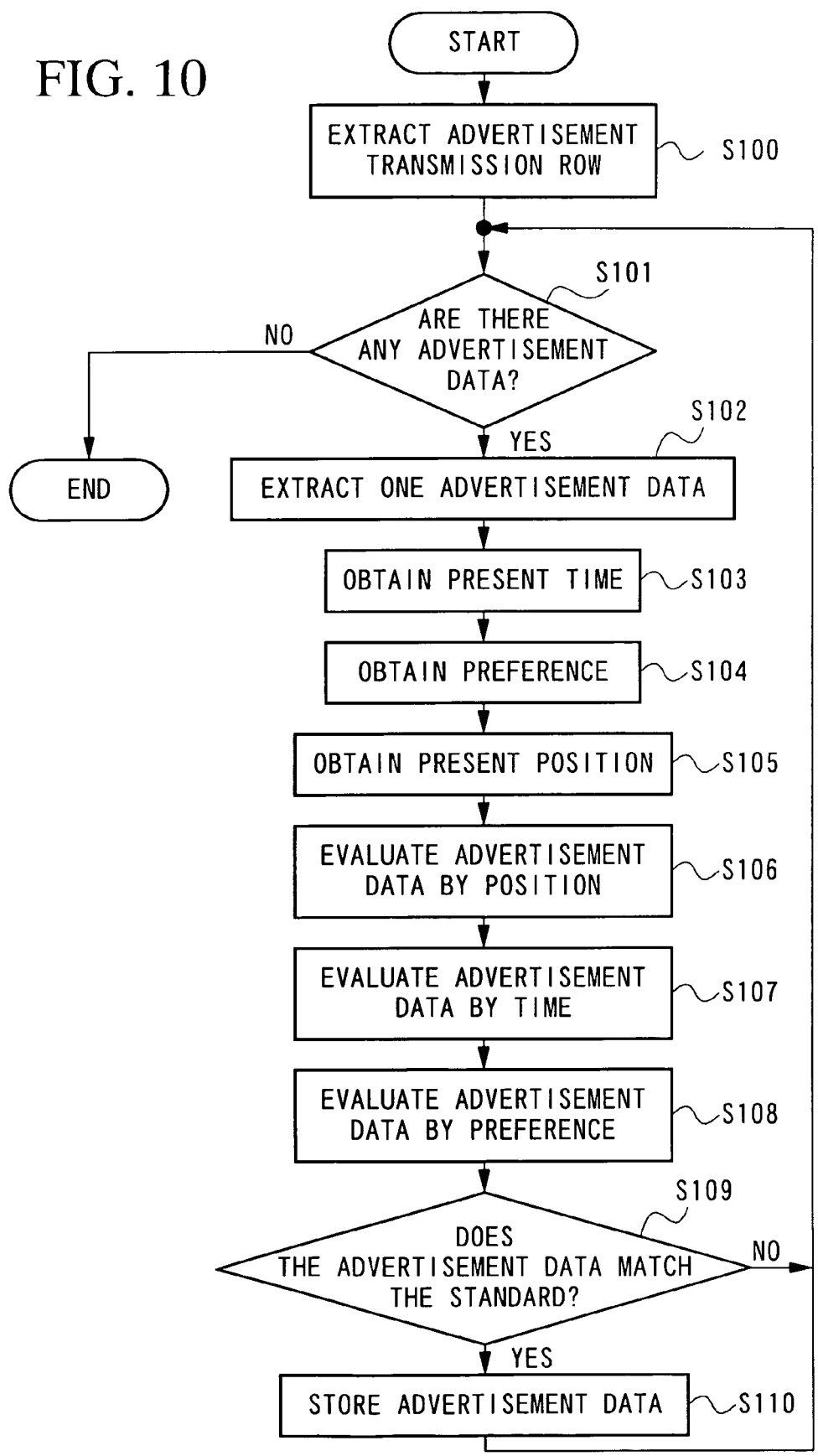
FIG. 10 is a diagram showing an example of the operation of an advertisement storage processor.

As shown in FIG. 10, the advertisement storage processor 106 extracts the advertisement data from the received advertisement transmission row 180, and stores the advertisement data which matches the standard, obtained by consulting the data of the time obtaining section 107, the preference obtaining section 108, and the position obtaining section 109, in the received advertisement data base 101. Firstly, the advertisement storage processor 106 extracts the advertisement transmission row 180 from the advertisement receiving section 105 (step S100).

The advertisement storage processor 106 then checks whether the advertisement transmission row 180 contains any advertisement data which has not been extracted (step S101). When there is no such advertisement data (No in step S101), processing ends.

On the other hand, when there is advertisement data which has not been extracted (Yes in step S101), the advertisement storage processor 106 extracts one advertisement data from the advertisement transmission row 180 (step S102).

The advertisement storage processor 106 obtains the present time (year, month, day and hour) from the time obtaining section 107 (step S103), obtains the user's preferences from the preference obtaining section 108 (step S104), and obtains the present position of the advertisement receiver 100 from the position obtaining section 109 (step S105).

The order which the steps S103, S104 and S105 are performed in is not restricted to that of this embodiment, and can be switched as desired. Alternatively, these steps may be performed simultaneously.

The advertisement storage processor 106 evaluates the extracted advertisement data according to its position (step S106).

In making this evaluation, for example, the advertisement constitution type box 3010 of the header 200 of the advertisement data is checked. For example, when the value in the advertisement constitution type box 3010 is "2" and the advertisement data comprises only a global advertisement, the advertisement data is evaluated as satisfying the position standard.

On the other hand, when the value in the advertisement constitution type box 3010 is "1" and the advertisement data comprises a combination of global and local advertisements, the local advertisement among the local advertisements of the local advertisement collecting section 202 which is closest to the present position obtained from the position obtaining section 109 is determined in step S105. More specifically, it is determined which of the local advertisements in the local advertisement collecting section 202 has the shortest distance between the local position 508 expressed by latitude and longitude and the present position.

A local advertisement is deemed to satisfy the standard when the distance between the nearest local position 508 and the present position is, for example, less than X km (e.g. 50 km). A distance exceeding this is deemed to be unsatisfactory. Here, "X" can be any value greater than zero.

Subsequently, the advertisement storage processor 106 evaluates the period of the advertisement data which has been evaluated by position (step S107).

For example, the evaluation need only be such that the standard is deemed to be satisfied when the present time obtained from the time obtaining section 107 in step S103 is within the time indicated by the advertisement presentation period 307 of the header 200 of the advertisement data, and not satisfied when the present time exceeds the time indicated by the advertisement presentation period 307.

For example, the standard is deemed to be satisfied when the present time is within the time shown in the advertisement valid period box 4020 of the global advertisement section 201 of the advertisement data, and not satisfied when the present time exceeds the time shown in the advertisement valid period box 4020.

Subsequently, the advertisement storage processor 106 evaluates the preference of the advertisement data which has been evaluated by time (step S108).

For example, the evaluation may be such that the standard is deemed not to be satisfied when any of the advertisement name 400, the advertisement category 401, the advertisement text 403, the company name 404, the company category 405, the local name 506 and local text 510 of an local advertisement which was satisfactorily evaluated according to position contain the key words of no interest, which were obtained from the preference obtaining section 108 in step S104 above. The advertisement data is given a satisfactory evaluation when the above do not contain the key words of no interest.

Subsequently, the advertisement storage processor 106 checks whether the advertisement data has satisfied all the evaluation standards in each of the above steps S106, S107, and S108 (step S109). In the case where any of the standards has not been satisfied, the processing returns to step S101 and the next advertisement data is evaluated. When all the standards have been satisfied, the advertisement data which satisfied the standards is stored in the received advertisement data base 101 (step S101).

According to the above processing, only the received advertisement data which satisfy the standards are stored in the received advertisement data base 101.

Example of Processing by Advertisement Extracting Section

Subsequently, one example of processing performed by the advertisement extracting section 110 will be explained based on the flowchart of FIG. 11.

Figure 11:
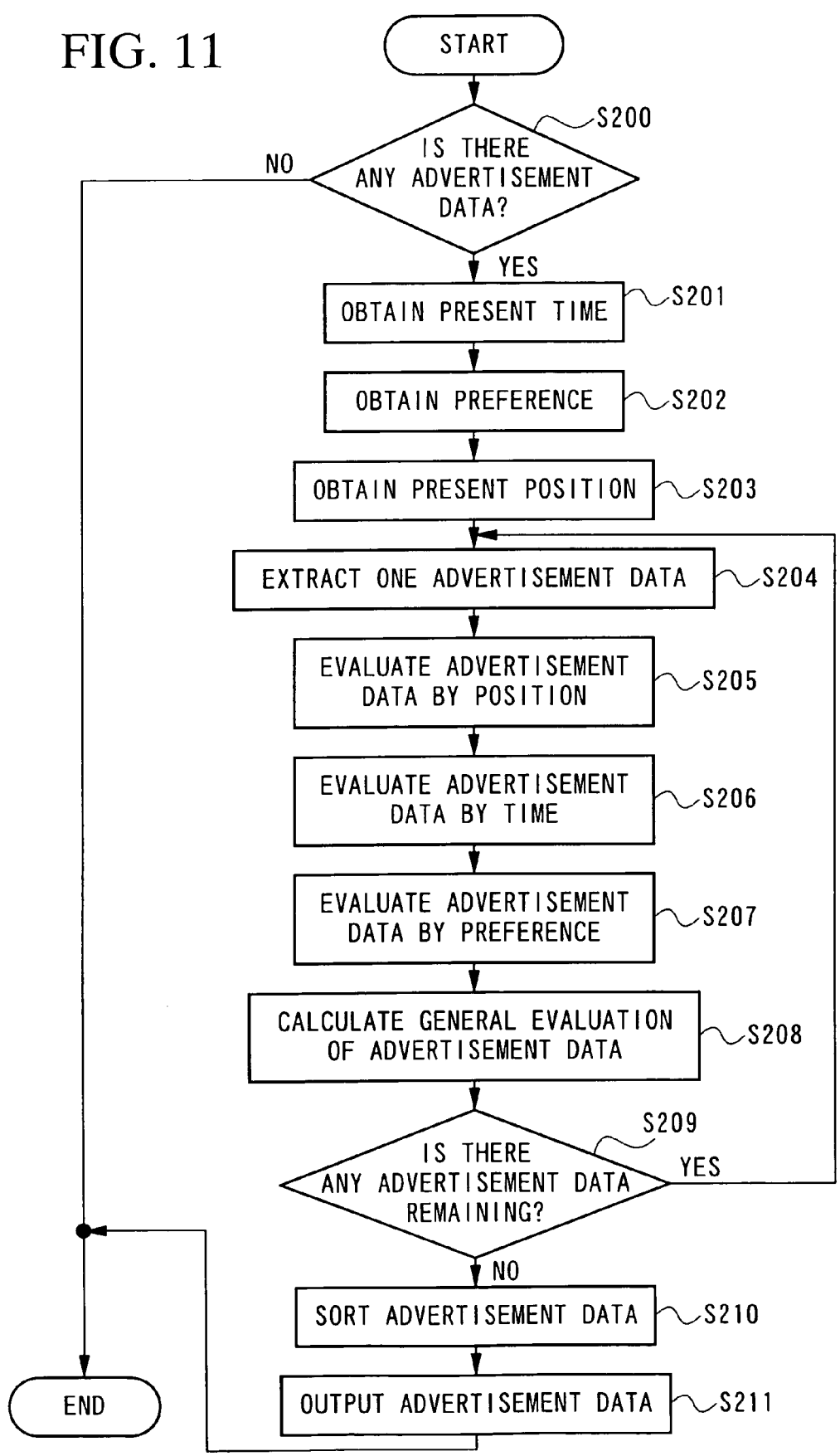
FIG. 11 is a diagram showing an example of the operation of an advertisement extracting section.

As shown in FIG. 11, the advertisement extracting section 110 extracts advertisement data which matches the standards, obtained by referring to the data of the time obtaining section 107, the preference obtaining section 108, and the position obtaining section 109, from advertisement data stored in the received advertisement data base 101. Firstly, the advertisement extracting section 110 checks whether there is any advertisement data in the received advertisement data base 101 (step S200).

When there is no advertisement data (No in step S200), the processing ends.

On the other hand, when there is advertisement data (Yes in step S200), the advertisement extracting section 110 obtains the present date as the reproduction time from the time obtaining section 107 (step S201), obtains the user's preferences from the preference obtaining section 108 (step S202), and obtains the present position of the advertisement receiver 100 from the position obtaining section 109 (step S203).

The advertisement extracting section 110 extracts one advertisement data from the received advertisement data base 101 (step S204).

The advertisement extracting section 110 evaluates the extracted advertisement data according to position (step S205).

The position evaluation value here is expressed as "ep", and has a minimum "ep_min"=0 and a maximum "ep_max"=1. That is, "ep_min"≦"ep"≦"ep_max".

For example, the advertisement constitution type 301 of the header 200 of the advertisement data is determined, and when the advertisement data comprises only a global advertisement, the evaluation value "ep" is raised to "ep_max". On the other hand, when the advertisement data comprises a combination of global and local advertisements, the local advertisement which has the shortest distance to the present position obtained in step S203 (i.e. the local advertisement which has the shortest distance between the local position 508 and the present position) is determined. The closer the distance between the present position and the local position 508 of the determined local advertisement, the higher the evaluation value "ep", and the greater the distance, the lower the evaluation value "ep".

Subsequently, the advertisement extracting section 110 evaluates the extracted advertisement data by time (step S206).

In this example, the evaluation by time is expressed as a value of "et", having a minimum "et_min"=0 and a maximum "et_max"=1. That is, "et_min"≦"et"≦"et_max".

For example, the evaluation value "et" may be changed to "et_max" when the present time obtained in the abovementioned step S201 is within the advertisement presentation period 3070 of the advertisement data header, and changed to "et_min" when the present time is not within the advertisement presentation period 3070. In the case that the evaluation value "et" was "et_max", it is only necessary to compare the present time with the time band specified by the local hours of business 507 of the advertisement data, and reduce the evaluation value "et" if the present time is outside the timeband specified by the local hours of business 507.

Subsequently, the advertisement extracting section 110 evaluates the extracted advertisement data by preference (step S207).

In this example, the evaluation by preference is expressed as a value "eo", having a minimum "eo_min"=0 and a maximum "eo_max"=1. That is, "eo_min"≦"eo"≦"eo_max".

For example, the evaluation value "eo" is reduced when the key words of no interest which were extracted in step S202 are contained in any of the advertisement name 400, the advertisement category 401, the advertisement text 403, the company name 404, the company category 405, and the local name 506 and local text 510 of an local advertisement which were determined by evaluation according to position. On the other hand, the evaluation value "eo" is increased when any of the above contain key words of interest.

Subsequently, the advertisement extracting section 110 makes a general evaluation of the advertisement data which have already been evaluated by position, time, and preference (step S208).

In this embodiment, the general evaluation value "e" of the advertisement data is determined by the following equation (2), which is identical to the equation (1) mentioned above, after assigning weights to each of the items.

$$e=(wp.ep)+(wt.et)+(wo.eo) \quad (2)$$

As an example of this calculation, when values of ep=0.8, et=1.0, eo=0.6, wp=1.0, wt=0.9, and wo=0.5 are inserted, the general evaluation e=2.0.

Subsequently, the advertisement extracting section 110 checks whether there is any unextracted advertisement data in the received advertisement data base 101 (step S209).

When advertisement data still remains (Yes in step S209), the processing returns to step S204 and the advertisement data is evaluated.

On the other hand, when no advertisement data remains (No in step S209), the advertisement data are stored in order of the size of their general evaluation values "e" (step S210). For example, when advertisement presentation contract type 306 of the header 200 of the advertisement data guarantees the number of advertisement presentations, the highest rank is positioned in the advertisement data obtained by sorting the maximum advertisement data having a number of advertisement presentations 308 greater than "1".

Subsequently, advertisement data which obtained highest general evaluation values "e" are output to the advertisement presenting section 111 (step S211). In this example, the highest n (e.g. two) advertisement data are output to the advertisement presenting section 111, n being a whole number greater than zero and less than the total number of advertisement data.

In a case where the advertisement presentation contract type 306 of the header 200 of the output advertisement data guarantees the number of advertisement presentations, when the value of the number of advertisement presentations 308 is greater than "1", "1" is subtracted from the number of advertisement presentations 308. The advertisement deletion processor 112 deletes advertisement data whose number of advertisement presentations 308 has decreased to "0" from the received advertisement data base 101.

Subsequently, the advertisement presenting section 111 presents the advertisement data which have been output from the advertisement extracting section 110 to the user.

Figure 12:
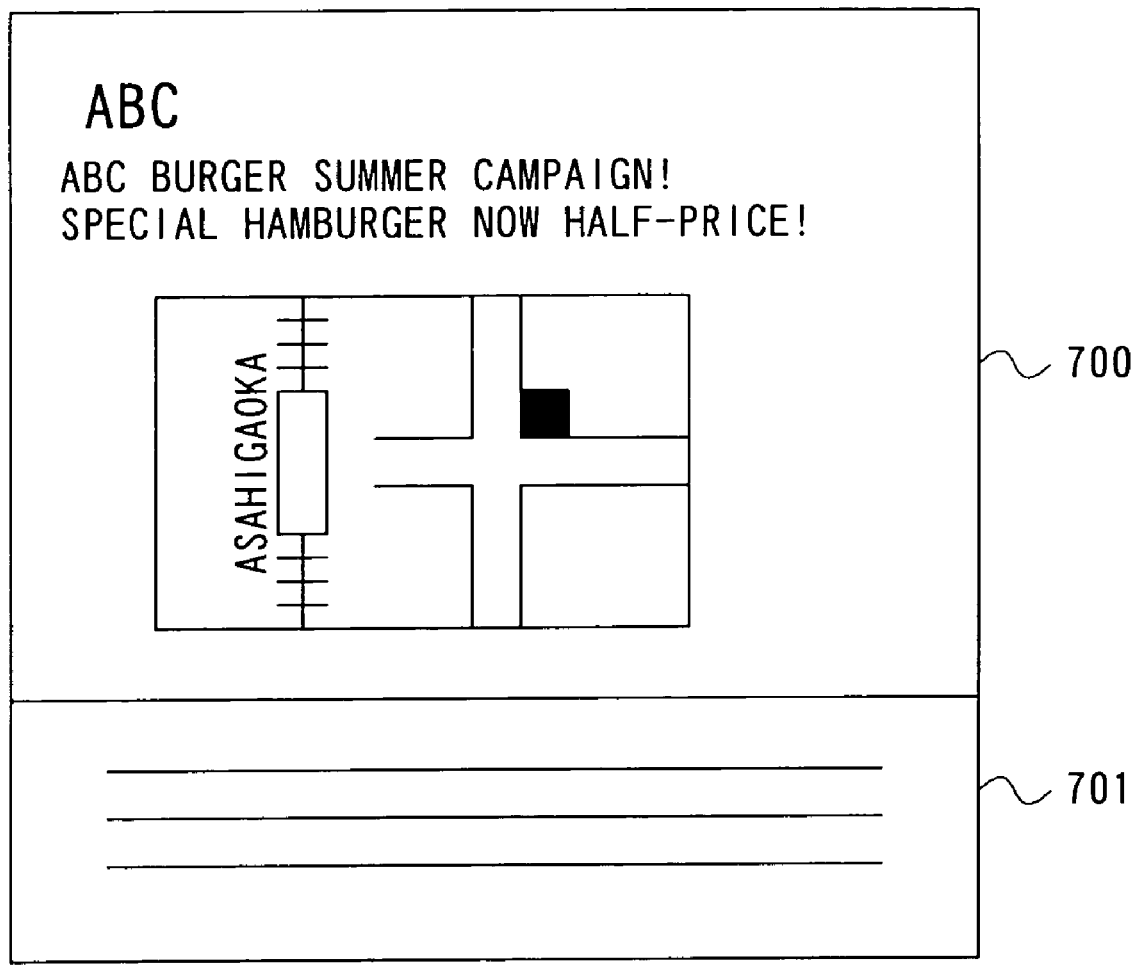
FIG. 12 is a diagram showing an embodiment of an advertisement presenting section.

FIG. 12 shows one example of a presentation by the advertisement presenting section 111.

The example in FIG. 12 shows the advertisement data of FIGS. 8 and 9 the global content 4060, the global header content 4070, and the global footer content 4080 of the global advertisement section 201, and the local content 5110 of the local advertisement collecting section 202 are presented in images and sound. In addition, a route image, which is set in accordance with the local route 509 of the local advertisement collecting section 202, is also presented. These images and letters are displayed on a monitor 700, and the sound is reproduced via a speaker 701.

The above embodiment described one example of a constitution of this invention under specific conditions, but this invention can be modified in various-ways. For example, the standards for determining and evaluating time, position, and preference in this invention are not restricted to those described in the above embodiment.

According to this invention, only advertisement data which satisfy standards relating to time, position, and preference are selected and stored. The advertisement data which have been stored are evaluated generally according to time, position, and preference, and are extracted in the order of highest evaluation. Therefore, it is possible to achieve effective advertisements which suit the circumstances of each individual user.

This invention enables advertisements for stores located near the users to be presented to those users, thereby increasing the probability that the users will purchase services and products at those stores. As a result, the sponsor companies can expect greater opportunities for sales.

Further, the probability that the users will purchase the advertised services and products at those stores can be increased by presenting advertisements which are linked to the positions and times of the users. As a result, the sponsor companies can expect greater opportunities for sales.

Further, advertisements which are of interest to each individual user can be presented by considering the preferences of individual users instead of targeting groups of users. As a result, the sponsor companies can expect greater opportunities for sales.

Further, according to this invention, the advertisement data comprises only data broadcasts, since the moving images and sound are accumulated as data in the vehicle. Therefore, complete advertisements can be reproduced for users at any time.

What is claimed is:

1. An advertisement method for presenting advertisement data, transmitted by using broadcasting, to users, the method comprising the steps of
   at a reception end, setting selection standards for a receive time, a receive position and preference of the user, selecting advertisement data which satisfy said standards from the received advertisement data, and storing the selected advertisement data in a received advertisement data base; and
   at the reception end, assigning an evaluation value to the stored advertisement data based on a reproduction time, a reproduction position and preference of said user, extracting the advertisement data in the order of highest evaluation value, and presenting said extracted advertisement data to the user in the order of highest evaluation value;
   wherein, in the case where said received advertisement data comprises data representing the period of the advertisement, in evaluating the time of said received advertisement data,
   said received advertisement data is given a high evaluation value when said receive time is within said period and a low evaluation value when said receive time is outside said period.

2. An advertisement method for presenting advertisement data, transmitted by using broadcasting, to users, the method comprising the steps of
   at a reception end, setting selection standards for a receive time, a receive position and preference of the user, selecting advertisement data which satisfy said standards from the received advertisement data, and storing the selected advertisement data in a received advertisement data base; and
   at the reception end, assigning an evaluation value to the stored advertisement data based on a reproduction time, a reproduction position and preference of said user, extracting the advertisement data in the order of highest evaluation value, and presenting said extracted advertisement data to the user in the order of highest evaluation value;
   wherein, in the case where said received advertisement data comprises data representing the position of the location of the advertisement target, in evaluating the position of said advertisement data, the shorter the distance between said receive position and said location the higher the evaluation value, and vice versa.

3. An advertisement method for presenting advertisement data, transmitted by using broadcasting, to users, the method comprising the steps of:
   at a reception end, setting selection standards for a receive time, a receive position and preference of the user, selecting advertisement data which satisfy said standards from the received advertisement data, and storing the selected advertisement data in a received advertisement data base;
   at the reception end, assigning an evaluation value to the stored advertisement data based on a reproduction time, a reproduction position and preference of said user, extracting the advertisement data in the order of highest evaluation value, and presenting said extracted advertisement data to the user in the order of highest evaluation; and
   storing key words which are of interest to said user and key words which are not of interest to said user; in evaluating the preference of said advertisement data;
   wherein the more key words which are of interest are contained in said advertisement data, the higher the assigned evaluation value, and the more key words which are not of interest are contained in said advertisement data, the lower the assigned evaluation value.

4. An advertisement method for presenting advertisement data, transmitted by using broadcasting, to users, the method comprising the steps of
   at a reception end, setting selection standards for a receive time, a receive position and preference of the user, selecting advertisement data which satisfy said standards from the received advertisement data, and storing the selected advertisement data in a received advertisement data base; and
   at the reception end, assigning an evaluation value to the stored advertisement data based on a reproduction time, a reproduction position and preference of said user, extracting the advertisement data in the order of highest evaluation value, and presenting said extracted advertisement data to the user in the order of highest evaluation value;
   wherein said evaluation value (e) is determined according to the following equation:

$e = (x)(ep) + (y)(et) + (z)(eo)$, wherein ep is based on a reproduction position, et is based on a reproduction time, eo is based on a preference of said user, and x, y, and z are numeric values.

* * * * *